United States Patent
Bartlett et al.

(10) Patent No.: US 9,687,753 B2
(45) Date of Patent: Jun. 27, 2017

(54) MULTI-REFRIGERATOR HIGH SPEED CRYOPUMP

(71) Applicant: Brooks Automation, Inc., Chelmsford, MA (US)

(72) Inventors: Allen J. Bartlett, Uxbridge, MA (US); Michael J. Eacobacci, Jr., Dennisport, MA (US); Sergei Syssoev, Townsend, MA (US)

(73) Assignee: Brooks Automation, Inc., Chelmsford, MA (US)

( * ) Notice: Subject to any disclaimer, the term of this patent is extended or adjusted under 35 U.S.C. 154(b) by 788 days.

(21) Appl. No.: 13/753,093

(22) Filed: Jan. 29, 2013

(65) Prior Publication Data
US 2013/0205805 A1    Aug. 15, 2013

Related U.S. Application Data

(63) Continuation of application No. PCT/US2011/045977, filed on Jul. 29, 2011.
(Continued)

(51) Int. Cl.
*F04B 37/08* (2006.01)
*F25B 9/10* (2006.01)
(Continued)

(52) U.S. Cl.
CPC .............. *B01D 8/00* (2013.01); *F04B 37/08* (2013.01); *F04B 37/14* (2013.01); *F25B 9/10* (2013.01); *F25D 19/006* (2013.01)

(58) Field of Classification Search
CPC ...... F25D 19/006; F04B 37/08; F04B 37/085; Y10S 417/901; F25B 9/14; F25B 9/10;
(Continued)

(56) References Cited

U.S. PATENT DOCUMENTS 2,966,035 A    12/1960  Gifford
2,984,458 A    5/1961   McFarlan
(Continued)

FOREIGN PATENT DOCUMENTS

JP    58131381 A    8/1983
JP    60-003491 A   1/1985
(Continued)

OTHER PUBLICATIONS

International Search Report and Written Opinion in International Application No. PCT/US2011/045977, 15 pages, mailed May 24, 2012.
(Continued)

*Primary Examiner* — Etsub Berhanu
*Assistant Examiner* — Nelson Nieves
(74) *Attorney, Agent, or Firm* — Hamilton, Brook, Smith & Reynolds, P.C.

(57) ABSTRACT

A refrigerator system or cryopump includes a first refrigerator having at least first and second stages, and a second refrigerator. A thermal coupling between the first stage of the first refrigerator and a cold end of the second refrigerator is restricted to maintain a temperature difference between the cold end of the second refrigerator and the first stage of the first refrigerator. The refrigerator system or cryopump also includes a radiation shield in thermal contact with the cold end of the second refrigerator, and a condensing surface, spaced from and surrounded by the radiation shield, and in thermal contact with a second stage, e.g., coldest stage, of the first refrigerator. The restricted thermal coupling can be configured to balance the cooling load on the two refrigerators.

18 Claims, 5 Drawing Sheets

Related U.S. Application Data (60) Provisional application No. 61/369,133, filed on Jul. 30, 2010.

(51) Int. Cl.
  B01D 8/00 (2006.01)
  F04B 37/14 (2006.01)
  F25D 19/00 (2006.01)

(58) Field of Classification Search
  CPC . B01D 8/00; F17C 3/085; F17C 3/086; F17C 2203/0308; F17C 2203/0312; F17C 2203/0316; F17C 2203/032
  See application file for complete search history.

(56) References Cited

U.S. PATENT DOCUMENTS

| | | | |
|---|---|---|---|
| 3,119,243 A | | 1/1964 | Hnilicka, Jr. et al. |
| 3,338,063 A | | 8/1967 | Hogan et al. |
| 4,148,196 A | | 4/1979 | Reid |
| 4,150,549 A | | 4/1979 | Longsworth |
| 4,240,262 A | | 12/1980 | Nakamura |
| 4,311,018 A | | 1/1982 | Welch |
| 4,449,373 A | | 5/1984 | Peterson |
| 4,584,839 A | | 4/1986 | Jensen et al. |
| 4,803,054 A | * | 2/1989 | Sillerud et al. ............... 422/109 |
| 4,834,136 A | * | 5/1989 | Bourke et al. ................ 137/549 |
| 4,966,016 A | | 10/1990 | Bartlett |
| 5,228,299 A | * | 7/1993 | Harrington et al. ............ 62/55.5 |
| 5,483,803 A | * | 1/1996 | Matte et al. .................... 62/55.5 |
| 5,901,558 A | * | 5/1999 | Matte et al. .................... 62/55.5 |
| 6,065,295 A | * | 5/2000 | Hafner et al. ...................... 62/6 |
| 6,081,110 A | * | 6/2000 | Moore et al. ............. 324/756.03 |
| 6,155,059 A | * | 12/2000 | Matte et al. .................... 62/55.5 |
| 6,378,312 B1 | * | 4/2002 | Wang ................................ 62/6 |
| 2001/0012485 A1 | * | 8/2001 | Gaudet et al. ................... 417/53 |
| 2002/0134089 A1 | * | 9/2002 | Rudick .............................. 62/6 |
| 2005/0166604 A1 | * | 8/2005 | Park ................................... 62/6 |
| 2006/0026968 A1 | * | 2/2006 | Gao .................................... 62/6 |
| 2006/0064990 A1 | * | 3/2006 | Bartlett et al. ................. 62/55.5 |
| 2006/0101836 A1 | * | 5/2006 | Tanaka ......................... 62/228.1 |
| 2006/0173344 A1 | * | 8/2006 | Marian et al. ................. 600/459 |
| 2007/0074522 A1 | * | 4/2007 | Kim et al. .......................... 62/6 |
| 2007/0157632 A1 | * | 7/2007 | Saito ................................... 62/6 |
| 2009/0120117 A1 | | 5/2009 | Martin |
| 2010/0011783 A1 | * | 1/2010 | Aoki et al. ..................... 62/55.5 |
| 2010/0043455 A1 | * | 2/2010 | Kuehl et al. ...................... 62/56 |
| 2010/0050661 A1 | * | 3/2010 | Snow et al. .................... 62/51.1 |
| 2010/0133941 A1 | * | 6/2010 | Feng et al. ............... 310/156.83 |
| 2010/0162756 A1 | * | 7/2010 | Clodic et al. ................... 62/643 |
| 2012/0272927 A1 | * | 11/2012 | Jonsson ....................... 122/19.1 |

FOREIGN PATENT DOCUMENTS

| | | |
|---|---|---|
| JP | 10-026427 A | 1/1998 |
| WO | WO 82/03993 A | 11/1982 |
| WO | WO 2009/014152 A1 | 1/2009 |
| WO | WO 2012/016192 A2 | 2/2012 |

OTHER PUBLICATIONS

International Preliminary Report on Patentability in International Application No. PCT/US2011/045977, 10 pages, mailed Feb. 2, 2013.

Syssoev, S. E., et al., "Controlled Formation of Condensed Frost Layers in Cryogenic High Vacuum Pumps," *J. Vac. Sci. Technol. A* 28(4): 925-930, (Jun. 2010).

Leybold Vacuum Full Line Catalog, pp. C12 26-27 (2005).

* cited by examiner

MULTI-REFRIGERATOR HIGH SPEED CRYOPUMP

RELATED APPLICATION

This application is a continuation of International Application No. PCT/US2011/045977, which designated the United States and was filed on Jul. 29, 2011, published in English, and which claims the benefit of U.S. Provisional Application No. 61/369,133, filed on Jul. 30, 2010. The entire teachings of the above applications are incorporated herein by reference.

BACKGROUND OF THE INVENTION

Cryopumps currently available are typically used in equipment for the manufacture of integrated circuits and other electronic components, as well as for the deposition of thin films in a variety of consumer and industrial products. The utility of the cryopumps is to create a contaminant-free vacuum by freezing or adsorbing gases from a work environment.

The design concepts of these cryopumps are similar. The cryopumps comprise a low temperature surface called a primary pumping surface, which operates in the temperature range of 4 to 25 Kelvin (K) and a higher temperature pumping-surface, which operates in the temperature range of typically 70 to 130 K. Typically, a cryogenically cooled radiation shield surrounds the primary pumping surface and provides radiation shielding. Between the chamber to be evacuated and the low temperature primary pumping surfaces is a frontal array at the higher temperature, which serves as a pumping site for the higher boiling point gases and also a radiation shield for the primary pumping surface. The frontal array is typically cooled to 70 to 130 K by thermal coupling it to the radiation shield.

In operation, high boiling point gases, such as water vapor, are condensed on the frontal array. Lower boiling point gases pass through that array and into a volume within the radiation shielding where they condense on the primary pumping surface. Often, an adsorbent, such as activated carbon, is placed on portions of these primary pumping surfaces or other surfaces at temperatures similar to these primary pumping surfaces to adsorb gases which have very low boiling point temperatures and are not condensed on the primary surface. With the gases thus condensed and/or adsorbed onto the pumping surfaces, a vacuum is created.

The refrigerator used for cooling the cryocondensing and adsorbent surfaces may be an open or closed cycle cryogenic refrigerator. The most common refrigerator used is a two-stage cold-finger, closed-cycle refrigerator. Typically, the cold end of the second stage, which is the coldest stage, is connected to the primary pumping and adsorption surfaces. The first stage is connected to the radiation shield which surrounds the primary pumping surface. The frontal radiation shield is cooled by the first stage heat sink through the radiation side shield by means of a thermal path through the complete length of the radiation shield. Typically, the temperature differential across that long thermal path from the frontal array to the first stage heat sink is between 10 and 50 K. Thus, in order to hold the frontal array at a temperature sufficiently low to condense out water vapor, typically less than 130 K, the first stage must operate at between 40 and 100 K.

The heat load which can be accepted by a cryocooler, such as a two-stage refrigerator, is strongly temperature dependent. At high operating temperatures conventional cryocoolers can accept higher heat loads. Thus, a reduction in the temperature differential between the frontal array and the first stage heat sink will allow an increase in the operating temperature of the first stage heat sink. This will allow the cryocooler to accept a higher heat load while maintaining the frontal array at an acceptable operating temperature. To accomplish this reduction in temperature differential, conventional cryopump designs utilize high conductivity materials such as copper in the radiation shields. The gradient can be further reduced by increasing the cross sectional area of the radiation shielding to thus increase the thermal conductance of that shielding. This increased mass of the shielding adds both weight and cost to the product and disadvantageously increases the cool down time and regeneration time of the cryopump.

SUMMARY OF THE INVENTION

A refrigeration system includes a first refrigerator having a first cooling load at a first temperature and a second refrigerator having a second cooling load at a second temperature. Also included is a thermal coupling between the two refrigerators to share thermal load, e.g., cooling load, between the refrigerators. The coupling is restricted to maintain a difference between the first and second temperatures.

The first refrigerator can include at least first and second stages and may be a closed cycle, two-stage refrigerator. The second stage of the first, two-stage refrigerator can be in thermal contact with a condensing surface of a cryopump. Further, the first stage of the two-stage refrigerator can be in thermal contact with the thermal coupling. The second refrigerator can be a closed cycle, single-stage refrigerator. In some embodiments, a second cooling load comprises a radiation shield of a cryopump. The second cooling load may also include a frontal array of the cryopump.

A cryopump includes a first refrigerator having at least first and second stages, and a second refrigerator. The cryopump further includes a thermal coupling between the first stage of the first refrigerator and a cold end of the second refrigerator, the thermal coupling being restricted to maintain a temperature difference between the cold end of the second refrigerator and the first stage of the first refrigerator. The cryopump also includes a radiation shield in thermal contact with the cold end of the second refrigerator, and a condensing surface, spaced from and surrounded by the radiation shield, and in thermal contact with a second stage, e.g., coldest stage, of the first refrigerator.

The first refrigerator can be a closed cycle, two-stage refrigerator and the second refrigerator can be a closed cycle, single-stage refrigerator. The restricted thermal coupling can be configured to balance the cooling load on the two refrigerators. The thermal coupling can be formed in a base plate of the radiation shield, the base plate having varying cross-sectional area to maintain a substantially uniform temperature at the periphery of the base plate. The base plate can have a substantially uniform thickness. In an embodiment, the base plate comprises an outer ring and an inner ring connected by a bridge and defining an opening through the plate, the outer ring being in direct thermal contact with the cold end of the second refrigerator, the inner ring being in direct thermal contact with the first stage of the first refrigerator, and the bridge forming the restricted thermal coupling between the two refrigerators. The bridge can be located on a side of the first refrigerator opposite from the second refrigerator. The opening in the base plate may be covered by a cover, the cover being in thermal contact with the outer ring of the base plate but isolated from the inner ring and the bridge.

The cryopump can further include a frontal cyopanel extending substantially across an opening in the radiation shield with the second stage of the first refrigerator positioned between the frontal cryopanel and the first stage. The frontal cryopanel may be in thermal contact with the cold end of the second refrigerator Further, the cryopump can include a high conductance heat flow path from the frontal cryopanel to the refrigerators, the heat flow path being independent of the radiation shield. For example, the high conductance heat flow path can be provided by at least one thermal conductance rod. In an embodiment, the high conductance heat flow path is provided by an array of thermal conductance rods arranged concentrically around but out of thermal contact with the condensing surface. The rods may be of equal diameter and can be in direct thermal contact with the base plate of the radiation shield.

A method of cryopumping with a cryopump includes cooling a condensing surface of the cryopump with a first refrigerator having at least first and second stages, the first stage operating at a first temperature. The method further includes cooling a radiation shield of the cryopump with a second refrigerator operating at a second temperature, and maintaining a difference between the first and second temperatures with a restricted thermal coupling between the two refrigerators.

A cryopump shield for a cryopump having first and second refrigerators includes a radiation shield including a sidewall having an open end and a closed end. The cryopump shield further includes a base plate coupled to the closed end of the radiation shield, the base plate including an outer section and an inner section, the sections connected by a bridge and defining an opening through the plate, the inner section configured to be in direct thermal contact with the first refrigerator, the outer section configured to be in direct thermal contact with the second refrigerator, the bridge forming a restricted thermal coupling between the two refrigerators.

Certain embodiments of the invention allow for improved refrigeration capability and overall efficiency of extended size cryopumps (e.g., more than 500 mm) used in a high vacuum environment where high pumping speed is required. One advantage is uniform temperature distribution across the frontal array through controlled heat leakage via a thermal coupling onto the first stage of a two-stage refrigerator. Other advantages are uniform frost growth and mechanical rigidity of the extended size radiation shield/first stage. Embodiments may use two radially placed heat sinks Optimized heat conductance rods may allow for more efficient use of available refrigeration to conduct heat from the pump's mouth to its base. The thermal conductance rods can be designed to carry sufficient heat for an extended size cryopump (more than 500 mm), and to have no interference with the frost growing on the second stage array, therefore allowing reduced or minimal degradation of pumping speed, as well as reduced or minimal impact on the system's overall weight. The cooling of the rods may be accomplished through a first stage base plate, cooled by two refrigerators, e.g., by a single-stage refrigerator unit and a two-stage or other multi-stage refrigerator unit.

To have increased cooling power on the pump's second stage, the first stage of the two-stage unit can be kept at a lower temperature through regulation of the heat flux received by the first stage. This regulation occurs by means of a thermal choke or bridge, e.g., a conductor of a prescribed geometry, to provide a thermal coupling between the two refrigerators. The uniformity of the temperature along the perimeter of the base plate can be achieved through variation of its cross-sectional profile, while uniformity of the temperature at the frontal array can be achieved by varying the diameter of the heat conductance rods.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

This invention relates to improvements of operational parameters of refrigeration systems, such as closed-loop cryogenic systems used as a refrigeration source for cryopumps. Such closed-loop refrigerators and cryopumps are described in U.S. Pat. No. 2,966,035 to W. Gifford et al., and U.S. Pat. No. 3,338,063 to W. Hogan et al. Cryopumps based on available closed-loop cryogenic refrigerators are typically limited in size to an inlet diameter of about 0.3 meters. With increased demand on the pumping speed, the inlet diameter of a cryopump needs to be made larger, thus rapidly increasing the total surface area of the cryoarray. Increased area of the cryoarray leads to higher thermal load. At some point, the limit of the cryogenic refrigerator is reached and further increase of the pump's size cannot be achieved without additional refrigeration. One approach is the use of additional refrigerators which allows the pump's radiation shield to be maintained at normal operation temperature. Cryopumps with multiple refrigerators are described in U.S. Pat. No. 4,966,016 to A. J. Bartlett, which is incorporated herein by reference in its entirely. An example of a cryopump having two refrigerators is the COOLVAC 18.000 CL (Leybold Vacuum, Full Line Catalog 2005, section C12, pages 26-27). The optimal use of the available refrigeration at the minimal cost is a design goal that can be difficult to achieve due to a number of constrains, including: maximum first stage array temperature vs. the system's overall weight, pumping speed vs. second stage thermal load, capacity vs. stability of operation, and manufacturability of the design vs. rigidity of the array sets. Vacuum processing and experimental vacuum equipment require highly reliable, long life cryogenic vacuum pumps. For these applications, the use of simple, economic design concepts is preferred.

A cryopump according to an embodiment of the present invention uses two coupled refrigerators, a single-stage refrigerator and a two-stage refrigerator, e.g., Gifford-Mac-Mahon refrigerators (Brooks Automation, Inc.), to cool the frontal array, radiation shield, and second stage primary pumping array. In order to deliver increased or maximum cooling power to the second stage, a thermal choke is used to limit the heat flux on the two-stage refrigerator from the radiation shield and frontal array. To provide an equal amount of refrigeration to any point of the frontal array, also referred to as the inlet baffle array, the temperature of the heat conductance rods is kept equal. This is achieved by varying the cross section of the base plate along its perimeter or varying the cross section of the rods. The rods are kept away from the second stage to allow maximum pumping speed and Type II gas capacity as well as uniform frost growth. Controlled formation of condensed frost layers within the pump can improve performance of the cryopump, as described in the paper by Sergei E. Syssoev, Michael J. Eacobacci, Jr., Allen J. Bartlett, Controlled formation of condensed frost layers in cryogenic high vacuum pumps, J. Vac. Sci. Technol. A 28(4):925-930, July/August 2010. Structural support of the first stage array can be accomplished via a post designed to provide rigidity of the array assembly while maintaining minimal thermal losses.

Figure 1A:
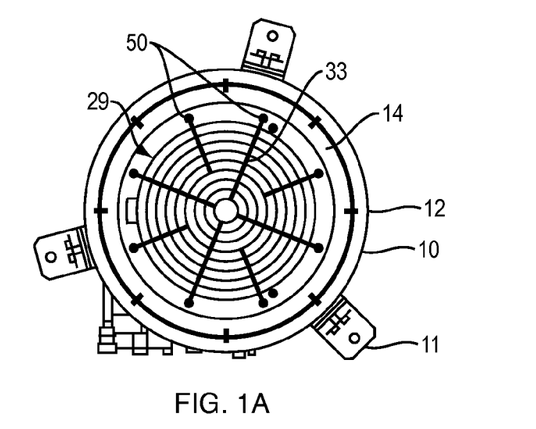
FIGS. 1A-1C are respective top, side, and bottom views of a dual-head high speed cryopump.
Figure 1B:
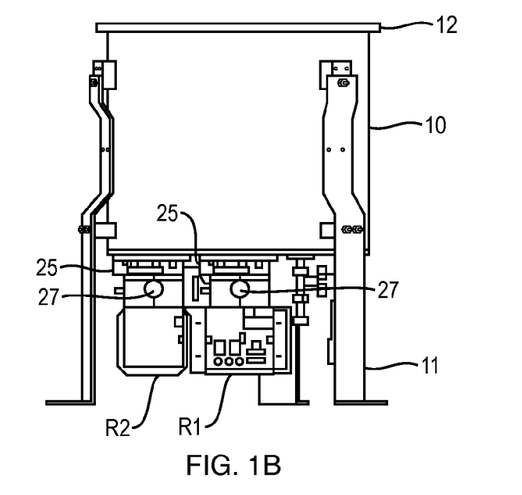
Figure 1C:
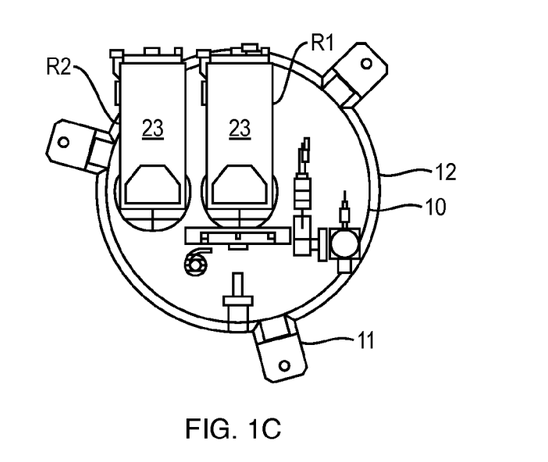

The cryopump of FIGS. 1A-1C and 2 comprises a main housing 10 which can be mounted to the wall of a work chamber (not shown) along a flange 12. A front opening 14 in housing 10 communicates with a circular opening in the work chamber. The cryopump includes three legs 11 for support prior to mounting to the work chamber. As shown in FIGS. 1B and 1C, the cryopump includes a first refrigerator R1 and a second refrigerator R2 mounted to the bottom of the housing 10, a cold finger of each refrigerator extending into the housing 10. In this case, each refrigerator is a Gifford-MacMahon refrigerator but other refrigerators may be used. In each refrigerator, a displacer in the cold finger is driven by a motor 23. With each cycle, helium gas introduced into the cold finger under pressure through a feed line 25 is expanded and thus cooled and then exhausted through a return line 27. Such a refrigerator is disclosed in U.S. Pat. No. 3,218,815 to Chellis et al.

Figure 2:
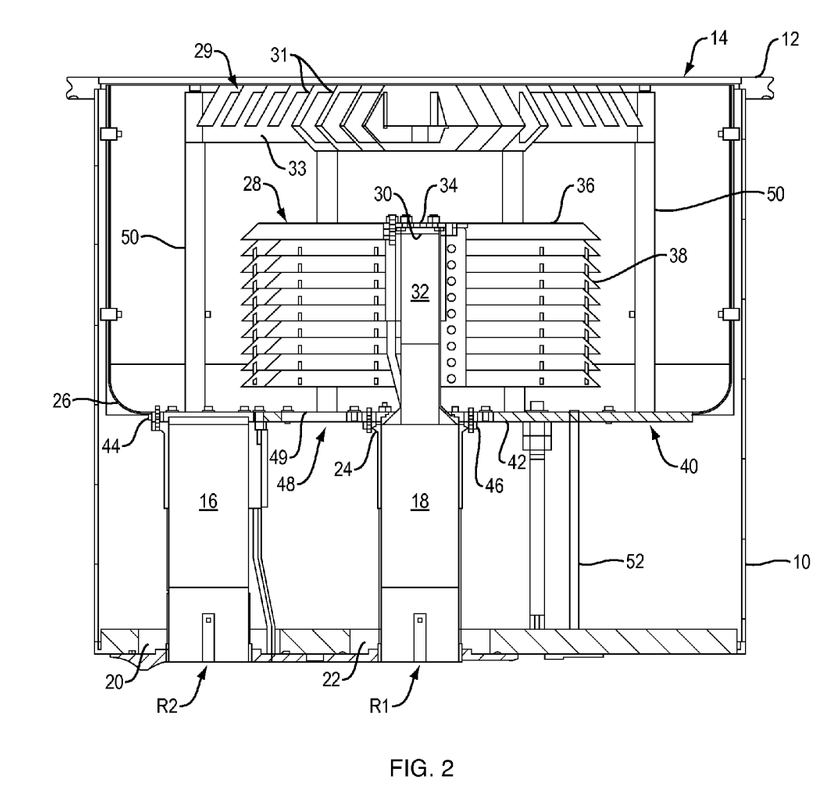
FIG. 2 is a partial cross sectional view of the cryopump of FIG. 1B with a two stage refrigerator, a single stage refrigerator, and a thermal coupling between the two refrigerators.

FIG. 2 is a partial cross sectional view of the cryopump of FIG. 1B showing the cold finger of a two-stage refrigerator, the cold finger of a single-stage refrigerator, and a thermal coupling between the two refrigerators. A two-stage cold finger 18, 32 of the first refrigerator R1 and a single-stage cold finger 16 of the second refrigerator R2 extend into the housing 10 through openings 20 and 22. The single stage 16 of the second refrigerator R2 is mounted to and in thermal contact with an outer ring 44 of a base plate 40 (see also FIG. 3A). A cold end 24 of the first stage 18 of refrigerator R1 is mounted to and in thermal contact with an inner ring 46 of base plate 40. Base plate 40, in turn, is mounted to and in thermal contact with a cup-shaped radiation shield 26 (see also FIG. 4). The radiation shield 26 surrounds a primary pumping surface 28 to form a cooled but higher temperature shield for minimizing the heating of the primary surface 28 by radiation. The temperature of the radiation shield may range from 45K adjacent to the single stage 16 of the second refrigerator R2 to about 130K adjacent to the opening 14.

A cold end 30 of the second stage 32 of the two-stage cold finger of the first refrigerator R1 extends through the base plate 40 and supports a heat sink 34. The heat sink 34 is in direct thermal contact with the primary pumping or condensing surface 28 of the cryopump. The primary pumping surface 28 comprises a disk or baffle 36 and two sets of semi-circular baffles 38, each set mounted to a bracket 35 in a vertical array. Each bracket 35 is in direct thermal contact with heat sink 34. Primary pumping surfaces or arrays that include circular and semi-circular baffles are described in U.S. Pat. No. 5,782,096 to Bartlett et al., and in U.S. patent application Ser. No. 12/008,985 by Bartlett et al., filed on Jan. 15, 2008 and published on Jul. 17, 2008 as Publication No. US 2008/0168778, which are herein incorporated by reference in their entirety. The primary condensing surface may hold a low temperature adsorbent such as activated carbon for adsorbing low boiling point gases such as hydrogen, helium, and neon. In order to effectively pump the low boiling point gases it is preferred that both the condensing surface and the adsorbent forming the primary pumping surface 28 be cooled to 8-15K.

In general, the refrigeration available at the second stage of a two-stage refrigerator is a function of the temperature of the first stage and the temperature of the second stage. For a given temperature of the second stage, the refrigeration capacity of the second stage decreases as the temperature of the first stage increases, for example, as a result of heat load to the first stage. Increasing the temperature of the first stage, however, also drives up the temperature of the second stage.

In conventional cryopumps, a single refrigerator is used to provide cooling in which the radiation shield with an attached frontal array is mounted to the first stage of a refrigerator and the second stage is coupled to the primary pumping surface. In environments where the radiation heat load to the first stage of these cryopumps increases, the load carrying capacity of the second stage decreases. This results in dragging the primary pumping surface up to a warmer temperature which reduces the amount of low boiling point gases pumped.

With the present invention, the first stage 24 of the two-stage refrigerator R1 is thermally coupled to the single-stage refrigerator R2 via a thermal coupling to share a total thermal load between the refrigerators. As shown in FIG. 2, base plate 40 provides the thermal coupling between refrigerators R1 and R2. Base plate 40 includes a thermal choke or bridge 42. Bridge 42 is designed to leak a controlled amount of the total heat load imposed onto refrigerator R2 to refrigerator R1, where refrigerator R2 operates at a higher temperature than that of refrigerator R1.

Figure 3A:
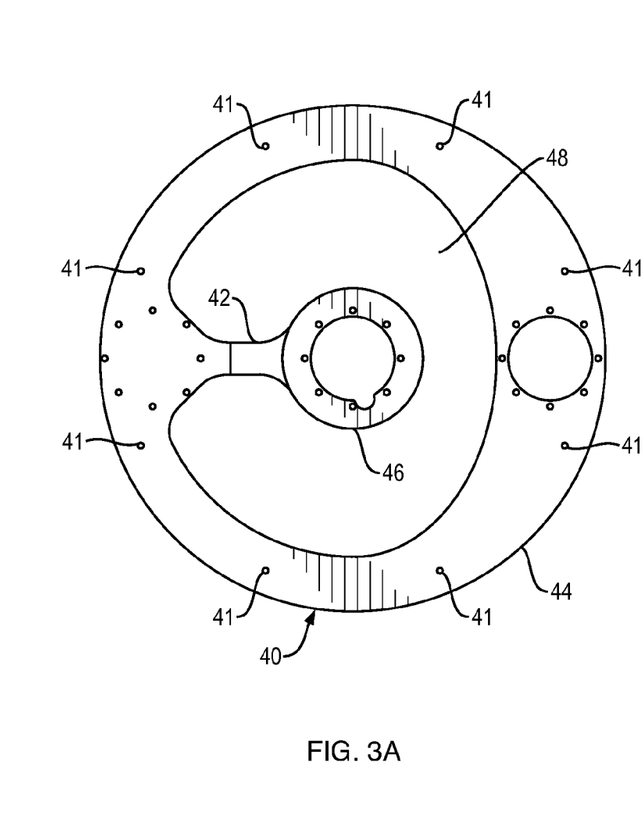
FIGS. 3A and 3B are a plan view and side view, respectively, of a base plate including a thermal choke.
Figure 3B:
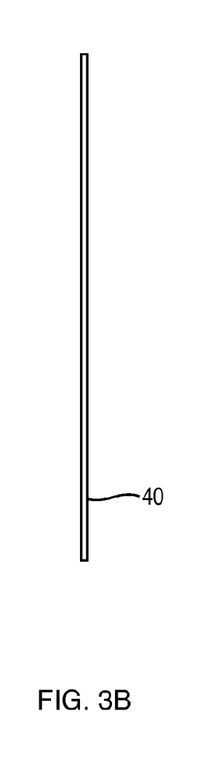

FIGS. 3A and 3B are a plan view and a side view, respectively, of the base plate 40 including thermal choke 42. As shown, the base plate 40 include outer ring 44 and an inner ring 46 connected by thermal choke or bridge 42. Outer and inner rings 44, 46 define an opening 48 through the plate. The outer ring 44 is configured to be mounted to the cold end of the second refrigerator R2. The inner ring 46 is configured to be mounted to the first stage 24 of the first refrigerator R1. In this way, the bridge or thermal choke 42 forms a restricted thermal coupling between the two refrigerators R1 and R2. As shown, bridge 42 is located on a side opposite from the second refrigerator R2 (see also FIG. 2).

Preferably, the opening 48 in the base plate is covered by a cover 49 (see FIG. 2 and also FIG. 4), the cover being in thermal contact with the outer ring 44 of the base plate but isolated from the inner ring 46 and the bridge 42. Cover 49 can be a thin plate that is brazed or soldered to base plate 40 but that is floating with respect to inner ring 46 and bridge 42. For example, an insulator may be sandwiched between the cover 49 and inner ring 46 and bridge 42. The cover keeps gases from the primary pumping surfaces and may provide radiation shielding. The base plate 40 can have varying cross-sectional area to uniformly distribute the heat load on the two refrigerators R1 and R2. For example, the size and shape of opening 48 and/or the outer ring 44 can be varied to distribute the heat load and maintain a substantially uniform temperature along the perimeter of the base plate.

As shown in FIG. 3B, base plate 40 may have a uniform thickness. However, the varying cross-sectional area may be obtained by the varied profile of FIG. 3A and/or a varied thickness. In general, base plate 40 can be manufactured from a material that has high heat conductivity and that provides structural integrity to support attachment of a radiation shield and other components of the cryopump. A suitable material is copper.

Figure 4:
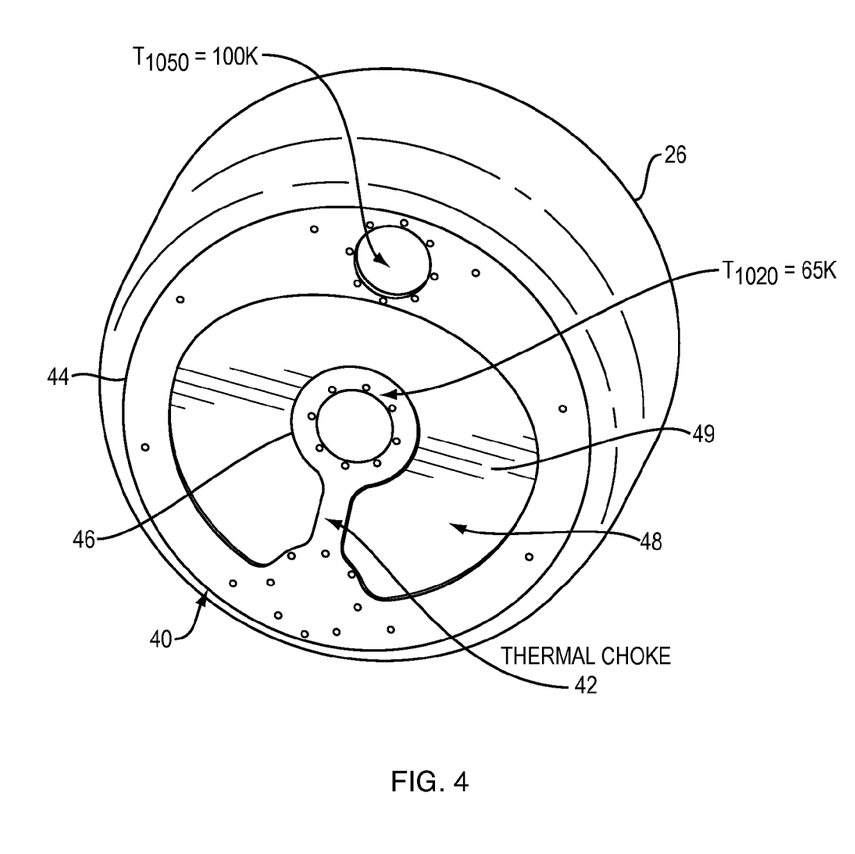
FIG. 4 is a bottom perspective view of the base plate of FIG. 3A attached to a radiation shield.

FIG. 4 is a bottom perspective view of the base plate 40 of FIG. 3A attached or coupled to a radiation shield 26. Radiation shield 26 includes a sidewall having an open end and a closed end, the base plate 40 being attached or coupled to the closed end. Radiation shield 26, including base plate 40, can define a condensing chamber of the cryopump. The base plate 40 includes an outer section or ring 44 and an inner section or ring 46, the sections connected by a bridge and defining an opening 48 through plate 40. In this example, base plate 40 is 0.25 inches thick and machined from copper. The uniformity of the temperature along the perimeter of the base plate can be achieved through variation of the cross-sectional profile of the base plate, for example by varying the size and shape of opening 48. The first refrigerator R1 can have a first cooling load at a first temperature and the second refrigerator R2 can have second cooling load at a second temperature. The thermal coupling between the two refrigerators R1 and R2, which in this example is base plate 40, is restricted at the thermal choke 42 to maintain a difference between the first and second temperatures. For example, the single-stage refrigerator R2 can be operated at 100 K and the first stage of the two-stage refrigerator R1 can be operated at 65 K, the two refrigerators linked by the thermal coupling that is restricted to control the heat leakage from the load imposed onto refrigerator R2 onto the first-stage of refrigerator R1. This way, the optimal operating points or temperatures of the refrigerators can be balanced out, which increases the refrigeration capacity of each refrigerator and the overall or summed refrigeration capacity of the coupled refrigerators. In addition, balancing the load between the two refrigerators allows the cryopump to operate at an optimal point, e.g., at an optimal refrigeration or pumping capacity.

The radiation shield 26, which can require the largest power load for cooling, is cooled by the single-stage refrigerator R2 and, via the thermal coupling, by the first stage of the two-stage refrigerator R1. For example, the single-stage refrigerator R2 may operate at a temperature of 100 K with a refrigeration capacity of 120 Watts (W) and the first stage of the two-stage refrigerator R1 may operate at a temperature of 65 K with a refrigeration capacity of 35 W. Because of the thermal choke, the optimal temperatures of refrigerator R2 (100K) and R1 (65K) can be maintained and their capacities can be combined for a summed refrigeration capacity of the cryopump's first stage of 155 W. This is an advantage over cryopumps where the first and second refrigerators are decoupled and the second refrigerator alone carries the load of the radiation shield without a contribution from the first refrigerator. In those pumps, the refrigeration capacity available to cool the radiation shield is typically only that of the second refrigerator, for example 120 W for a single-stage refrigerator operating at 100 K. Thermally coupling the two refrigerators through a thermal choke also offers advantages over cryopumps where the first and second refrigerators are linked by directly coupling the refrigerators. If coupled directly, the first-stage refrigerator would be run at a temperature of the first-stage of the two-stage refrigerator, e.g., 65 K, so as to not warm up the second stage of the two-stage refrigerator. This is so because increasing the temperature of the first stage drives up the temperature of the second stage of the two-stage refrigerator, which typically is undesirable. So, one would not couple the two refrigerators at a higher temperature, e.g., 100 K. At the lower temperature of 65 K, however, the refrigeration capacity of the second, single-stage refrigerator may be reduced to 85 W. Thus, the summed refrigeration capacities available for cooling the radiation shield from the directly-coupled first and second refrigerators may only be 120 W.

A cryopump with a controlled thermal coupling between the single-stage refrigerator and the first stage of the two-stage refrigerator can operate at higher heat loads because the first stage of the two stage refrigerator carries some of the load. For example, in some applications higher volumes of the process gases, such as argon, which are condensed on the second stage, must be pumped, creating a higher heat load on the two-stage refrigerator. Because the refrigeration available at the second stage depends on both the temperature of the first and the temperature of the second stage, a controlled thermal coupling of the first stage to a single-stage refrigerator operating at 100 K can boost refrigeration capacity of the two-stage unit. If decoupled, the first stage might get too cold, reducing refrigeration capacity of first stage of the two-stage unit. In conventional pump designs, heaters have been used to control the temperatures at the first stage of a two-stage refrigerator. Heaters may also be put on the single-stage refrigerator. Using a base plate with a thermal choke to control heat flow in thermally coupled refrigerators R1 and R2 according to the present invention can eliminate the need for heaters. If the heat load to the cryopump is known, it may be easier to design the base plate to get proper temperatures at the first and second refrigerators without heaters. Furthermore, the single-stage refrigerator R2 may be accompanied by other single-stage devices to achieve the required cooling capacity. Thus, the present invention allows the power load for large cryopumps to be distributed among smaller commercially available refrigerators, rather than redesigning a larger refrigerator capable of handling the load. This invention also provides the advantages of reducing lead times and costs by providing commonality of parts for new products requiring larger cryopumps.

Returning now to FIG. 2, the cryopump includes a frontal cryopanel or frontal array 29 that serves as both a radiation shield for the primary pumping surface and as a pumping or condensing surface for higher boiling temperature gases such as water vapor. This panel comprises a circular array of concentric louvers and chevrons 31 joined by spoke-like plates 33, as described in U.S. Pat. No. 4,454,722 to Allen J. Bartlett et al. The configuration of this cryopanel need not be confined to circular concentric components; but it should be so arranged as to act as a radiant heat shield and a higher temperature cryopumping panel while providing a path for lower boiling temperature gases to the primary pumping surfaces. As shown in FIG. 2, structural support of the first stage array assembly, including frontal array 29, can be accomplished via post 52. Post 52 can be stainless steel and can be designed to provide rigidity of the array assembly while maintaining minimal thermal losses.

In conventional cryopumps, the frontal array 29 is mounted to the radiation shield 26, and the shield both supports the frontal array and serves as the thermal path from a heat sink, e.g., the cold end of the first stage or a two-stage refrigerator, to that array. The shield 26 must be sufficiently large to permit unobstructed flow of gases to the primary cryopanel. As a result, the thermal path length of that shield from the heat sink to the frontal array is long. To minimize the temperature differential between the frontal array and the heat sink, massive radiation shields would be required.

In accordance with this invention, one or more thermal members or thermal rods 50 extend between base plate 40 and the frontal cryopanel or array 29. Rods 50 support frontal array 29 and can provide a high conductance heat flow path from the frontal array 29 to base plate 40. As shown in FIG. 3A, outer ring 46 of base plate 40 includes mounting holes 41 where the rods 50 couple to the base plate. As described above, base plate 40 is mounted to and in direct thermal contact with the first stage heat station 24 of the two-stage refrigerator R1 and with the single stage 16 of refrigerator R2. Base plate 40 distributes the thermal load from the frontal array 29 and the radiation shield 26 to the two refrigerators. As shown in FIG. 2, the rods pass outside of the primary pumping surfaces 28, 36, 38. The rods 50 are able to have a short length between the base plate 40 and the frontal array or inlet baffle 29. As a result, a thermal path having a given conductance can be obtained with a much lesser cross sectional area than would be required of the radiation shield if it served as the sole heat flow path. The heat flow path from the cold finger 16 and heat station 24 of first stage 18 to the center of the frontal panel 29 can be reduced as compared to the conventional path length through the radiation shield 26. This permits a reduction in overall mass of the entire array of elements connected to the cold finger 16 and first stage 24. A cryopump having thermal struts extending through the second stage array is described in U.S. Pat. No. 4,356,701 to Allen J. Bartlett et al.

As shown in FIG. 2, a high conductance heat flow path can be provided by an array of thermal conductance rods 50 arranged around but out of thermal contact with the primary pumping or condensing surfaces 28, 36, 38. Keeping the rods away from the primary pumping surface of the second stage allows for maximum pumping speed and capacity and for uniform frost growth. If the rods are too close to the primary pumping surface, the volume and thus the total pump capacity of lower boiling point gases on the second stage is reduced. Keeping the rods outside of and spaced away from the primary pumping surface allows for the collection of larger volumes of frozen gases and enables the use of the cryopump in an environment of larger gas flows and larger thermal loads. The rods 50 may be arranged concentrically around the primary pumping surface 28. In the example shown, eight rods 50 are arranged in a circle at equally spaced intervals, one end of each rod connected to a corresponding spoke-like plate 33 of frontal array 29 (see FIG. 1A) and the other end to based plate 40 via mounting holes 41 (see FIG. 3A). The rods 50 can have equal diameter for ease of manufacturing. A suitable material for the rods is copper.

Figure 5:
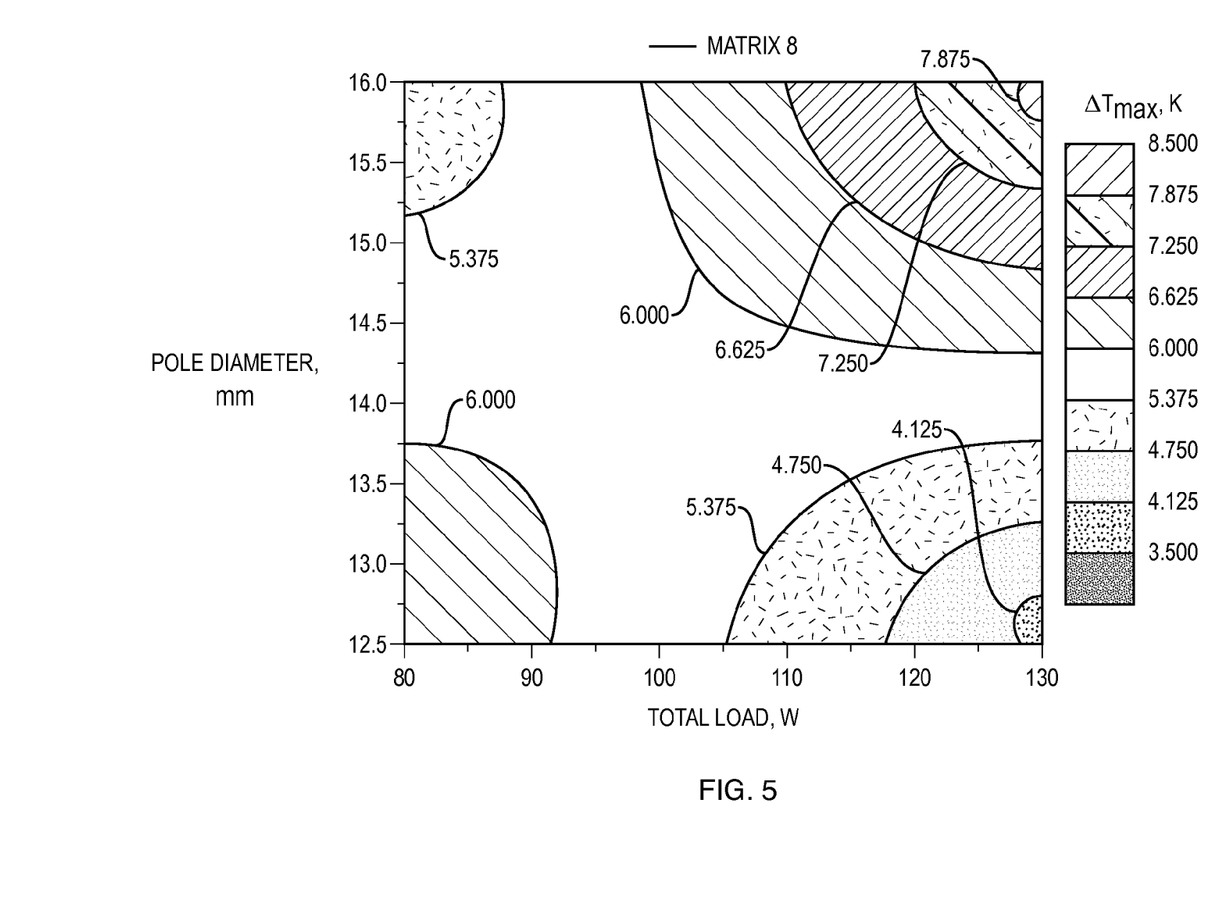
FIG. 5 illustrates maximum temperature differences at the frontal array for a range of diameters of heat conductance rods and for a range of total thermal load.

FIG. 5 illustrates maximum temperature differences at the frontal array for a range of diameters of heat conductance rods 50 and for a range of total thermal loads. The maximum temperature differences are between two fixed locations on the frontal array, one location being closest to the single-stage refrigerator, the other location being farthest from the single-stage refrigerator. The temperature differences shown in FIG. 5 are based on simulation results using an array of eight rods. Rod diameter, shown as pole diameter on the vertical axis, varied from 12.5 mm to 16 mm; total load, shown on the horizontal axis, varied from 80 to 130 W. Over these ranges of rod diameters and loads the temperature difference, Delta Tmax, at the frontal array varied from 3.5 to 8.5 K. Notably, for some rod diameter values, e.g., 14 mm, simulation results show the same temperature difference over the range of total loads tested. Similarly, for some total load values, e.g., 95 W, simulation results show the same temperature difference across the range of rod diameters tested. Using simulation results such as those shown in FIG. 5, the diameter of rods can be optimized for a broad range of thermal loads. For example, uniformity of the temperature at the frontal array can be achieved by varying the diameter of the heat conductance rods for a given geometry of the frontal array.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims. For example, a closed cycle, two-stage refrigerator is shown. A cryopump cooled by an open cycle refrigerant such as liquid nitrogen, hydrogen or helium may also be used. Also, various combinations of single- and multi-stage, e.g., two-stage, closed cycle refrigerators may be used to provide cooling. Further, the cryopump, including the inlet opening, frontal array and radiation shield, may be non-circular, e.g., rectangular. Also, the baffles of the pumping arrays need not be disks or semi-circular plates but can be rectangular plates and may be flat or bent. While this invention has been primarily shown and described with respect to cryopumps, the principles of the invention can be applied to other applications where holding two devices at two different temperatures is desired. Possible applications include the cooling of superconductors, e.g., the cooling of leads to superconductors to minimize thermal losses. For example, in imaging devices that use superconducting coils, the leads to the coils, which are typically normal conductors, are another thermal load at a higher temperature than the coils and it is desirable to reduce that load. Another possible application is a gas stripper, where two or more thermally coupled refrigerators operating at different temperatures can be used to reclaim different constituents from a stream of gases. Thermally coupling the refrigerators according to principles of the present invention can leverage excess refrigeration capacity of one refrigerator to add to the refrigeration capacity of another refrigerator.

What is claimed is:

1. A cryopump comprising:
a housing;
a first refrigerator having at least first and second stages;
a second refrigerator;
a thermal coupling between a cold end of the first stage of the first refrigerator and a cold end of the second refrigerator, the thermal coupling formed by a bridge conductor restricted to form a thermal choke that restricts heat flow, to maintain a temperature difference between the cold end of the second refrigerator and the cold end of the first stage of the first refrigerator, the thermal coupling being a plate separated from and not defined by the housing;

a radiation shield in thermal contact with the cold end of the second refrigerator, wherein the thermal coupling is distinct from the radiation shield and coupled to the radiation shield; and a condensing surface, spaced from and surrounded by the radiation shield, in thermal contact with the second stage of the first refrigerator.

2. The cryopump of claim 1, wherein the first refrigerator is a closed cycle, two-stage refrigerator.

3. The cryopump of claim 2, wherein the second refrigerator is a closed cycle, single-stage refrigerator.

4. The cryopump of claim 1, wherein the thermal coupling is configured to balance cooling load on the first and second refrigerators.

5. The cryopump of claim 1, wherein the thermal coupling is formed in a base plate coupled to the radiation shield, the base plate having varying cross-sectional area to maintain a substantially uniform temperature at a periphery of the base plate.

6. The cryopump of claim 5, wherein the base plate has a substantially uniform thickness.

7. The cryopump of claim 5, wherein the base plate includes an outer ring and an inner ring, the outer and inner rings connected by a bridge and defining an opening through the base plate, the outer ring being in direct thermal contact with the cold end of the second refrigerator, the inner ring being in direct thermal contact with the first stage of the first refrigerator, the bridge forming the thermal coupling between the two refrigerators.

8. The cryopump of claim 7, wherein the opening in the base plate is covered by a cover, the cover being in thermal contact with the outer ring of the base plate but isolated from the inner ring and the bridge.

9. The cryopump of claim 7, wherein the bridge is located on a side of the first refrigerator opposite from the second refrigerator.

10. The cryopump of claim 1 further comprising:
    a frontal cryopanel extending substantially across an opening in the radiation shield with the second stage of the first refrigerator positioned between the frontal cryopanel and the first stage; and
    a high conductance heat flow path from the frontal cryopanel to the cold end of the second refrigerator, the heat flow path being independent of the radiation shield.

11. The cryopump of claim 10, wherein the high conductance heat flow path is provided by at least one thermal conductance rod.

12. The cryopump of claim 10, wherein the high conductance heat flow path is provided by an array of thermal conductance rods arranged around but out of thermal contact with the condensing surface.

13. The cryopump of claim 12, wherein the thermal conductance rods are of equal diameter.

14. The cryopump of claim 12, wherein the thermal coupling is formed in a base plate of coupled to the radiation shield, the base plate being in direct thermal contact with the thermal conductance rods.

15. A method of cryopumping with a cryopump, the method comprising:
    cooling a condensing surface of the cryopump with a first refrigerator having at least first and second stages, a cold end of the first stage operating at a first temperature;
    cooling a radiation shield of the cryopump with a second refrigerator operating at a second temperature; and
    maintaining a difference between the first and second temperatures with a thermal coupling between the first and second refrigerators, the thermal coupling formed by a bridge conductor restricted to form a thermal choke that restricts heat flow, the thermal coupling being a plate separated from and not defined by a housing of the cryopump,
    wherein the thermal coupling is distinct from the radiation shield and coupled to the radiation shield.

16. The method of claim 15, wherein the thermal coupling is between the cold end of the first stage of the first refrigerator and a cold end of the second refrigerator.

17. The method of claim 15, wherein the thermal coupling is formed in a base plate coupled to the radiation shield, the base plate having varying cross-sectional area, and further comprising:
    maintaining a substantially uniform temperature at a periphery of the base plate with the varying cross-sectional area of the base plate.

18. The method of claim 15, further comprising balancing cooling load on the first and second refrigerators with the thermal coupling.

* * * * *